Patented Jan. 16, 1923.

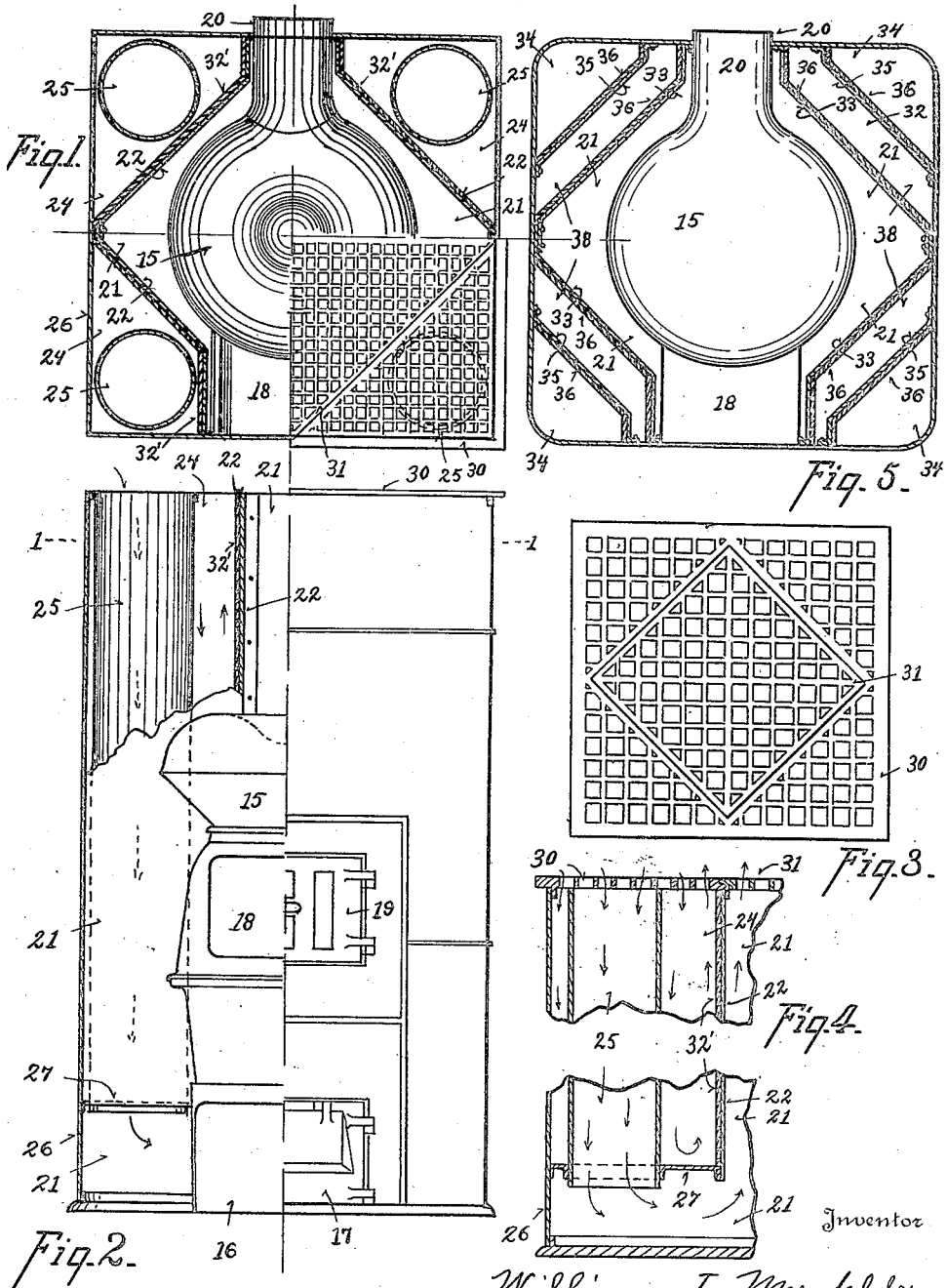

1,442,628

UNITED STATES PATENT OFFICE.

WILLIAM L. MERSFELDER, OF CINCINNATI, OHIO.

PIPELESS FURNACE.

Application filed June 12, 1922. Serial No. 567,787.

*To all whom it may concern:*

Be it known that I, WILLIAM L. MERSFELDER, a citizen of the United States, residing at Cincinnati, in the county of Hamilton and State of Ohio, have invented certain new and useful Improvements in Pipeless Furnaces, of which the following is a specification.

My invention relates to improvements in pipeless heating furnaces. One of its objects is to provide an improved arrangement of cold and heated air flues or conduits whereby a maximum flow of air to and from the air heating chamber of the furnaces is insured. Another object is to provide an improved arrangement of air conduits whereby the cold air conduits are protected and air jacketed against heat by radiation or conduction from the furnace, and their full efficiency as cold air conduits preserved. Another object is to provide an improved radiator grid arrangement. Another object is to provide an improved and economical structural arrangement of the casing constituting the hot and cold air conduits and air heating chamber. My invention also comprises certain details and relation of component members, all of which will be fully set forth in the description of the accompanying drawing in which:—

Fig. 1— is a plan, partly in section on line 1—1 of Fig. 2 of a pipeless furnace embodying my improvements.

Fig. 2— is a view partly in side elevation and with parts of the casing broken away to show the interior construction.

Fig. 3— is a plan of the grid detached.

Fig. 4— is a detail of one of the cold air conduits detached.

Fig. 5— is a plan with the grid removed showing a modification.

The accompanying drawing illustrates the preferred embodiment of my invention in which 15 represents a hot air furnace comprising an ash-pit, a fuel grate and a fire box, the details of which are not essential to my present invention. At the front the furnace is provided with a port 16 leading from the exterior to the ash-pit, and with an ash pit door 17. The furnace 15 is also provided with a fuel charging port 18 and a fuel charging door 19. At the rear of the furnace 15 is an off-take flue 20 through which the flue gases or products of combustion are conducted away from the furnace to a stack not shown.

Immediately surrounding the furnace and its ports 16, 18, and 20 is a substantially rectangular air heating chamber 21, formed by the vertical partition walls 22, which serve to separate the air heating chamber from the jacketing spaces 24 and from the cold air flues or conduits 25.

An exterior rectangular sheet metal frame or casing inclosing the air heating chamber 21, the compartments 24 and the cold air conduits 25 is formed by the four vertical sheet metal walls 26. Across the lower ends of the compartments 24 are horizontal sheet metal partition plates 27. The tubular cold air conduits 25 of which four are shown are supported respectively upon the partition plates 27 with their lower ends projecting a short distance through said plates 27. The compartments 24 are therefore closed on all sides and at their lower ends, and are open only at their upper ends, and said compartments 24, of which four are shown, are grouped about the air heating chamber 21, preferably occupying the corners of the external casing 26, thereby providing a casing structure of great strength and rigidity from a minimum amount of material. The cold air flues are each open at both top and bottom, so that cold air may enter at the top and flow downwardly therein and discharge at the lower ends of said flues through perforations in the plates 27 into the lower portion of the air heating chamber adjacent to the ash-pit. The cold air at the lower portion of the air heating chamber 21 as it becomes heated rises around the upper and more highly heated portions of the furnace and finally escapes upwardly into the room to be heated from the upper end of the chamber 21.

A radiator or grid comprises a rectangular grid member 30, which is preferably rigidly and permanently mounted upon the walls 26 and 22, through which air passes to the cold air conduits 25, and to and from the compartments 24, and a central grid member 31, which is preferably detachably supported upon the edge of the central opening of the grid member 30, and through which grid member 31, the heated air passes upwardly from the air heating chamber 21 into the room to be heated.

The partition walls 22 are preferably provided with some heat insulating means, as for instance a backing of asbestos or other heat insulating material 32', or its equivalent, to prevent as far as possible transfer of heat from the air heating chamber 21 into the air compartments 24 or to the cold air conduits 25, in order to prevent transfer of heat to the cold air in its passage downwardly through the conduits 25, since any heat transmitted to the air in conduits 25 tends to reduce the volume of flow of cold air downwardly through said conduits 25. The compartments 24 act as an additional means to automatically prevent transfer of heat from chamber 21 to the cold air in conduits 25, by reason of cold air entering said spaces 24 from the room above, and forming slowly moving columns of cold air each surrounding a conduit 25 as an air jacket space. Any heat transmitted from chamber 21 to a portion of the air in one of the spaces 24, causes the air so heated to rise by convection and to enter the room above and thereby make room for a like volume of cold air to enter and take its place in the compartment 24, thus constantly and automatically eliminating heat from the compartments 24 and maintaining a supply of cold air continuously therein.

In Fig. 5— I have illustrated a modification of the furnace shown in Fig. 1, in which in place of the cylindrical cold air conduits 25 entirely inclosed by the air jacketing compartments 24, I provide air jacketing compartments 32 separated from the air heating chamber 21 by means of the partition plates 33 and separated from the cold air conduits 34 by means of partition plates 35, so that the air jacketing compartments are each interposed between the air heating chamber 21 and one of the cold air conduits 34 to prevent transmission of heat from the furnace member and air heating chamber to the cold air in the cold air conduits. I also contemplate using a heat insulating material 36, such as asbestos on one side of both the partition plates 33 and 35 to further protect the cold air in conduits 34 from transmission of heat thereto. The lower ends of the jacketing compartments 32 are closed by horizontal partitions 38, and the lower ends of the cold air conduits connect with the lower portion of the air heating chamber substantially as shown in Fig. 4, and for the purpose specified in connection therewith. The use of the partition plates 35 effects an economy in structural material over the form shown in Fig. 1 and provides a more rigid structure.

The apparatus herein shown and described is capable of considerable modification without departing from the spirit of my invention.

What I claim is:

1. A pipeless furnace comprising a centrally located furnace member, a main casing open at the top and enclosing said furnace member upon all sides except for the necessary furnace ports, an air heating chamber directly enclosing said furnace member and formed within said main casing by means of partition walls, a plurality of air jacketing compartments formed by said partition plates intermediate of said air heating chamber and said main casing, said air jacketing compartments being open at their tops and closed at their bottoms, a plurality of cold air conduits open at the top to receive cold air and open at their lower ends to discharge cold air into the lower portion of said air heating chamber and protected by said air jacketing compartments from the transmission of heat thereto from said furnace member and air heating chamber.

2. A pipeless furnace comprising a centrally located furnace member, a substantially rectangular and substantially vertical main casing open at the top and enclosing said furnace member upon all sides except for the necessary furnace ports, a substantially rectangular air heating chamber directly enclosing said furnace member and formed within said main casing by means of partition walls across the corners of said main casing to thereby separate said main casing into a centrally located air heating chamber, and a plurality of air jacketing compartments, located in the respective corners of said main casing, a plurality of vertical air jacketing compartments open at the top and closed at the bottom and located intermediate of said air heating chamber and said main casing and a plurality of vertical cold air conduits open at the top to receive cold air and open at the bottom to discharge cold air into the lower portion of said air heating chamber, said cold air conduits being protected by said jacketing compartments from the transmission of heat thereto from said furnace member or said air heating chamber.

3. A pipeless furnace comprising a centrally located furnace member, a substantially rectangular and substantially vertical main casing open at the top and enclosing said furnace member, a substantially rectangular air heating chamber directly enclosing said furnace member and formed within said main casing by partition plates across the corners of said main casing, and a plurality of cold air conduits located in the corners of said main casing and each open at the upper end to receive cold air and open at the lower end to discharge cold air into the lower portion of said air heating chamber.

4. A pipeless furnace comprising a centrally located furnace member, a substantially rectangular and substantially vertical main casing open at the top and enclosing said furnace member, a substantially rectangular air heating chamber directly enclosing said furnace member and formed within said main casing by partition plates across the corners of said main casing, and a plurality of cold air conduits located in the corners of said main casing and each open at the upper end to receive cold air and open at the lower end to discharge cold air into the lower portion of said air heating chamber, and means to insulate said cold air conduits from said air heating chamber.

5. A pipeless furnace comprising a centrally located furnace member, a substantially rectangular and substantially vertical main casing open at the top and enclosing said furnace member, a substantially rectangular air heating chamber directly enclosing said furnace member and formed within said main casing by partition plates across the corners of said main casing, and a plurality of cold air conduits located in the corners of said main casing and each open at the upper end to receive cold air and open at the lower end to discharge cold air into the lower portion of said air heating chamber, a main substantially rectangular grid mounted upon the upper end of said main casing and provided with a substantially rectangular opening over the upper end of said air heating chamber, and a detachable grid member to close the central opening in said main grid.

In testimony whereof I have affixed my signature.

WILLIAM L. MERSFELDER.